United States Patent [19]

Granata, Jr. et al.

[11] Patent Number: 4,853,301

[45] Date of Patent: Aug. 1, 1989

[54] FUEL CELL PLATES WITH SKEWED PROCESS CHANNELS FOR UNIFORM DISTRIBUTION OF STACK COMPRESSION LOAD

[75] Inventors: Samuel J. Granata, Jr., Greensburg; Boyd M. Woodle, North Huntingdon Township, Westmoreland County, both of Pa.

[73] Assignee: The United States of America as represented by the United States Department of Energy, Washington, D.C.

[21] Appl. No.: 804,415

[22] Filed: Dec. 4, 1985

[51] Int. Cl.$^4$ ............................................. H01M 8/02
[52] U.S. Cl. ....................................... 429/39; 429/210
[58] Field of Search ...................... 429/38, 39, 12, 210

[56] References Cited

U.S. PATENT DOCUMENTS

| | | | |
|---|---|---|---|
| 3,554,803 | 1/1971 | Poirier | 429/39 |
| 3,573,102 | 3/1971 | Lane et al. | 429/39 |
| 3,573,104 | 3/1971 | Snyder et al. | 429/39 |
| 4,276,355 | 6/1981 | Kothmann et al. | |
| 4,292,379 | 9/1981 | Kothmann . | |
| 4,310,605 | 1/1982 | Early et al. | 429/39 |
| 4,324,844 | 4/1982 | Kothmann . | |
| 4,342,816 | 8/1982 | Kothmann et al. | |
| 4,366,211 | 12/1982 | Pollack . | |
| 4,383,009 | 5/1983 | Kothmann . | |
| 4,396,689 | 8/1983 | Grimes et al. | 429/39 |
| 4,407,904 | 10/1983 | Uozumi et al. | 429/39 |
| 4,631,239 | 12/1986 | Spurrier et al. | 429/12 |

FOREIGN PATENT DOCUMENTS 57-136777 11/1982 Japan .
1323144 7/1973 United Kingdom ................. 429/39

Primary Examiner—Donald L. Walton

[57] ABSTRACT

An electrochemical fuel cell includes an anode electrode, a cathode electrode, an electrolyte matrix sandwiched between electrodes, and a pair of plates above and below the electrodes. The plate above the electrodes has a lower surface with a first group of process gas flow channels formed thereon and the plate below the electrodes has an upper surface with a second group of process gas flow channels formed thereon. The channels of each group extend generally parallel to one another. The improvement comprises the process gas flow channels on the lower surface of the plate above the anode electrode and the process gas flow channels on the upper surface of the plate below the cathode electrode being skewed in opposite directions such that contact areas of the surfaces of the plates through the electrodes are formed in crisscross arrangements. Also, the plates have at least one groove in areas of the surfaces thereof where the channels are absent for holding process gas and increasing electrochemical activity of the fuel cell. The groove in each plate surface intersects with the process channels therein. Also, the opposite surfaces of a bipolar plate for a fuel cell contain first and second arrangements of process gas flow channels in the respective surfaces which are skewed the same amount in opposite directions relative to the longitudinal centerline of the plate.

5 Claims, 5 Drawing Sheets

FUEL CELL PLATES WITH SKEWED PROCESS CHANNELS FOR UNIFORM DISTRIBUTION OF STACK COMPRESSION LOAD

CROSS REFERENCE TO RELATED APPLICATIONS

Reference is hereby made to the following copending applications dealing with related subject matter and assigned to the assignee of the present invention:

1. "Apparatus For Supplying Electrolyte To Fuel Cell Stacks" by Spurrier, assigned U.S. Ser. No. 718,773 and filed Mar. 1, 1985.

2. "Fuel Cell Plates With Improved Arrangement Of Process Channels For Enhanced Pressure Drop Across The Plates" by F. R. Spurrier et al, assigned U.S. Ser. No. 804,414 and filed Dec. 4, 1985 now U.S. Pat. No. 4,631,239.

BACKGROUND OF THE INVENTION

1. Field of the Invention

The present invention relates generally to fuel cells which convert the latent chemical energy of a fuel into electricity directly through electrochemical reactions and, more particularly, is concerned with fuel cell plates employing skewed process channels for providing a more uniform distribution of the compression load imposed on the fuel cells in a stack thereof.

2. Description of the Prior Art

One common fuel cell system includes a plurality of subassemblies which, except for the top and bottom subassemblies, each include two bipolar plates between which is supported two gas electrodes, one an anode and the other a cathode, and a matrix with an ion-conductive electrolyte, such as phosphoric acid, between the anode and cathode electrodes. The subassemblies, herein referred to as fuel cells, are oriented one atop another and electrically connected in series (alternate electron and ion paths) to form a fuel cell stack. The top end plate of the top subassembly and the bottom end plate of the bottom subassembly are each half-bipolar plates. Representative examples of such fuel cell system are disclosed in U.S. Pat. Nos. to Kothmann et al (4,276,355; 4,342,816), Kothmann (4,292,379; 4,324,844; 4,383,009) and Pollack (4,366,211) which, with the exception of U.S. Pat. Nos. 4,342,816 and 4,383,009, are assigned to the assignee of the present invention.

Process gases, such as a fuel and an oxidant are supplied respectively to the anode and cathode electrodes via manifolds attached to the stack and channels defined in the bipolar plates. The fuel in the form of hydrogen atoms when supplied to the anode dissociates into hydrogen ions and electrons. The electrons are transmitted from the anode electrode across the bipolar plate to the next cell's cathode electrode, while the hydrogen ions migrate directly through the acidic electrolyte to its cell's cathode, where they react with electrons from another anode and oxygen to form water. This is repeated through the stack out through the ends where the electron transfers from the last anode to the last cathode as the other end of the stack is through the external circuit where useful work is produced.

The bipolar plates of the fuel cells basically function to structurally support and physically separate the individual fuel cells and provide cavities for the process gases to access the anode and cathode electrodes where the electrochemical reaction occurs. The plates are normally rectangular or square in shape with a series of generally parallel channels formed in both top and bottom surfaces thereof. Recently, several problem areas have been recognized with respect to the process gas flow channel configurations found in conventional fuel cell bipolar plates.

First, a problem exists with respect to inadequate process gas flow distribution to the fuel cells in the lower portion of the fuel cell stack as compared to in the upper portion. Conventional process channels in bipolar plates tend to be relatively short and have few directional changes. As a consequence, process gas pressure drop in the horizontal direction in traversing the plate channels within a given fuel cell is small in comparison with the pressure drop in the stack distribution manifold and piping system in the vertical direction. This results in an inherently poor flow distribution of the process gases to the fuel cells, more flow to the cells in the upper portion than in the lower portion of the fuel cell stack. One approach to reduce this problem involves restricting the flow of process gases between the supply piping and the manifold cavities adjacent to the stacks to artificially increase the pressure drop in the parallel fuel cell circuits between the supply and exit piping and thereby improve flow distribution. However, this approach complicates the stack design, increasing the number of parts and, thus, cost.

Second, a problem exists with respect to non-uniform distribution of a compressive load carried across the fuel cells which maintains the fuel cells operatively assembled together in the stack. Depending upon the particular desired configuration for process gas flow through the fuel cell (i.e., crossflow, countercurrent, concurrent, or some combination thereof), the flow channels in one surface of a bipolar plate may run either perpendicular or parallel to the flow channels in the other surface of the plate. Thus, with respect to any given fuel cell, the flow channels in the lower surface of the top plate will run either perpendicular or parallel to the flow channels in the upper surface of the bottom plate. Also, a typical fuel cell includes a sealing component or gasket at the outer edges of the cell that fits between the plates and forms a boundary to separate the process gases from each other and from the external environment.

The areas where the lands or ribs defining the channels in the upper and lower plate surfaces overlap represent the areas of contact (through the electrodes and electrolyte matrix) between the cell plates through which the compressive load is transferred. In regions where the ribs cross perpendicular to each other, the contact area between the opposing plate surfaces remains nearly constant, varying only to the extent that manufacturing tolerances affect the width of the ribs. In regions where the ribs are parallel to each other, the contact area is also a function of manufacturing tolerances affecting the width of the ribs; but in addition, variations in channel to channel placement, molding shrinkage, edge machining and assembly alignments (plate to plate) also affect contact area. The net result is that parallel rib contact area varies much more than perpendicular rib contact area.

The cell components are quite susceptible to damage and premature failure if the contact areas are not controlled within certain limits, to limit contact stress and related cell strain. Any significant thickness variations associated with the plates compound the problem by providing local areas of higher or lower stress. A low stress limit must be maintained to insure minimum electrical contact resistance for uniform cell performance. To optimize uniform cell performance it is desirable to have both parallel and perpendicular contact areas nearly the same so the compression load is carried uniformly across the cell.

Consequently, a need still exists for improvements in the configuration of the fuel cell process gas flow channels in order to alleviate the problems of inadequate flow distribution across the fuel cells in a stack thereof and non-uniform compression loading of the fuel cells.

SUMMARY OF THE INVENTION

The preferred embodiments of the fuel cell plates, as disclosed herein, include several improved features which meet the aforementioned needs. While the improved features are particularly adapted for working together to facilitate improved efficiency and reliability of fuel cells incorporated in a common stack, it is readily apparent that such features may be incorporated either singly or together in various fuel cell configurations.

Some of the several improved features comprise the invention claimed in the second copending application cross-referenced above; however, all of the improved features are illustrated and described herein for facilitating a complete and thorough understanding of those of the features comprising the present invention.

The present invention relates to an improved skewed arrangement of process gas channel configurations on opposite plate surfaces of a bipolar plate.

Accordingly, the present invention is directed to an improvement in an electrochemical fuel cell including an anode electrode, a cathode electrode, an electrolyte matrix sandwiched between the electrodes and a pair of plates above and below the electrodes. The plate above the electrodes has a lower surface with a first group of process gas flow channels formed thereon, whereas the plate below the electrodes has an upper surface with a second group of process gas flow channels formed thereon. The channels of each group extend generally parallel to one another. The improvement is comprised by the process gas flow channels on the lower surface of the plate above the anode electrode and the process gas flow channels on the upper surface of the plate below the cathode electrode being skewed in opposite directions such that contact areas of the surfaces of the plates through the electrodes are formed in crisscross arrangements. In addition, at least one groove is provided in areas of the surfaces of the plates where the channels are absent (but present in the plate on the opposite side of the cell) for holding process gas and increasing electrochemical activity of the fuel cell. The groove in each plate surface does not have to intersect with the process channels therein, but preferably, the groove does intersect and is in flow communication with the process channels on the same surface of the plate.

Also, the present invention is directed to a bipolar plate for a fuel cell, comprising: (a) a base having opposite surfaces and a longitudinal centerline; (b) a first arrangement of process gas flow channels on one of the surfaces of the base; and (c) a second arrangement of process gas flow channels on the other of the surfaces of the base. The first arrangement of channels are skewed the same amount in one direction as the second arrangement of channels are skewed in the opposite direction relative to the longitudinal centerline of the base. The bipolar plate also includes a first arrangement of ribs on the one opposite surface of the base which define the first arrangement of gas flow channels, and a second arrangement of ribs on the other opposite surface of the base which define the second arrangement of gas flow channels. Each of the rib arrangements define grooves in areas of the surfaces where the channels are absent for holding process gas and increasing electrochemical activity of the fuel cell. Preferably, the grooves intersect with the channels on the same surface of the base.

These and other advantages and attainments of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which.

DETAILED DESCRIPTION OF THE INVENTION

Figure 1:
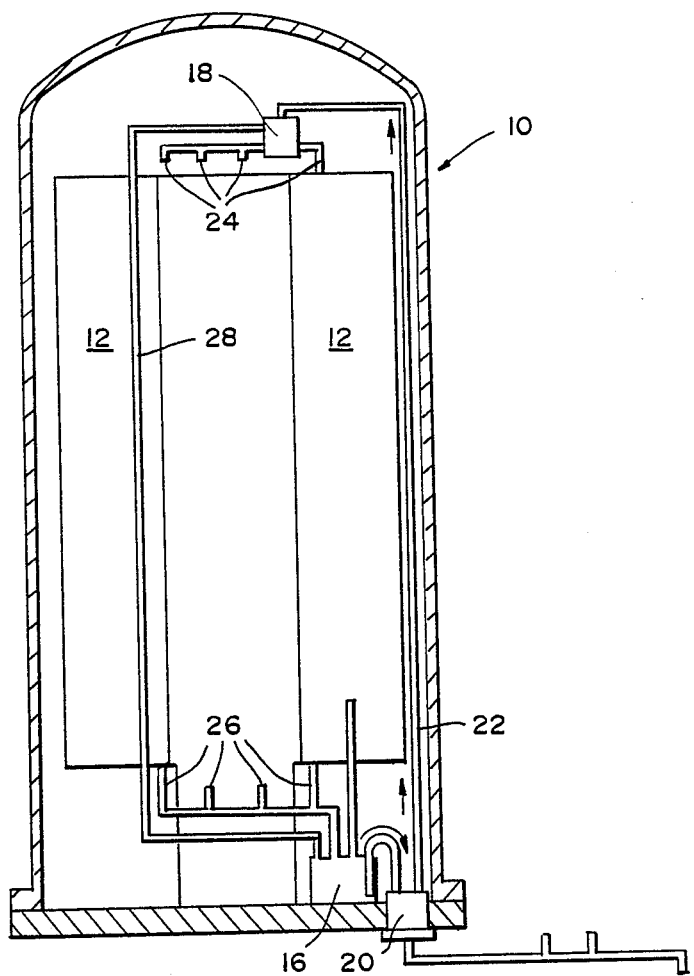
FIG. 1 is an elevational view, partly in section, of a fuel cell stack module, with portions omitted for purposes of clarity, which incorporates fuel cells constructed in accordance with the present invention.

In the following description, like reference characters designate like or corresponding parts throughout the several views. Also, in the following description, it is to be understood that such terms as "forward", "rearward", "left", "right", "upwardly", "downwardly" and the like, are words of convenience and are not to be construed as limiting terms.

In General

Referring now to the drawings, and particularly to FIG. 1, there is shown an electrochemical fuel cell stack module, generally designated by the numeral 10, which includes a plurality of fuel cell stacks 12. Each fuel cell stack 12 contains a multiplicity of repeating fuel cells 14 (one of which is diagrammatically illustrated in FIG. 2) which incorporate the features of the present invention as well as those of the cross-referenced application.

For maintaining the fuel cell stacks 12 in an optimum electrolyte-wetted condition, the fuel cell stack module 10 also includes an electrolyte reservoir 16, a distribution block 18, and a pump 20 for supplying electrolyte from the reservoir 16 via primary supply line 22 to the distribution block 18. The fuel cell stacks 12 are connected individually in flow communication with the electrolyte distribution block 18 and reservoir 16 by respective stack supply lines 24 and return or drain lines 26. Specifically, the distribution block 18 includes an electrolyte chamber (not shown) for each stack 12 in the module 10 and a single overflow chamber (not shown). The stack supply lines 24 interconnect electrolyte fill holes (not shown) in the top of the respective stacks 12 with the distribution block electrolyte chambers, whereas an overflow return line 28 connects the electrolyte overflow chamber of the distribution block 18 with the reservoir 16. For a more detailed description of this electrolyte supply system associated with the module 10, attention is directed to the first application cross-referenced above, the disclosure of which is incorporated herein by reference.

In operation, a predetermined electrolyte volume is forced by the pump 20 through the primary supply line 22 to the distribution block 18. Within the block 18, an equal amount of electrolyte is delivered to each electrolyte chamber. Excess electrolyte flows into the overflow chamber and is returned to the reservoir 16 through the overflow return line 28. Electrolyte from the chambers is delivered through the stack supply lines 24 to the fill holes in the tops of the respective stacks 12.

In order to avoid creation of a short circuit through the electrically-conductive electrolyte, and damage to the fuel cell stacks 12, electrolyte is delivered in predetermined periodic pulses of short duration by the pump 20 rather than by continuous flow. Gravitational force assists circulation of electrolyte through the fill holes and grooves (not shown) of the fuel cell stacks. Any electrolyte not absorbed passes out of the stacks 12 through the drain holes (not shown) and is returned to the reservoir 16 through the drain lines 26.

Figure 2:
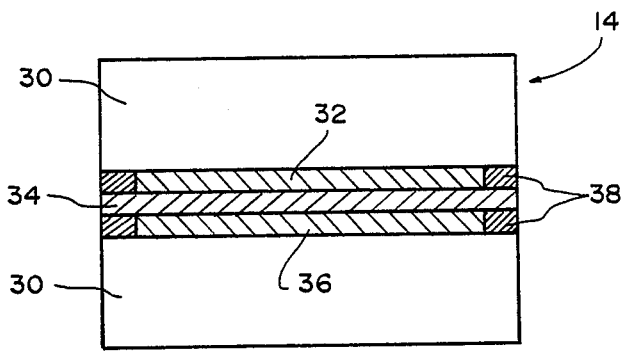
FIG. 2 is a vertical cross-sectional view of a single fuel cell removed from the fuel cell stack module of FIG. 1, with electrolyte fill holes and flow grooves and process gas channels and manifolds associated therewith being omitted for purposes of clarity.

As mentioned, each fuel cell stack 12 of the module 10 includes a multiplicity of repeating fuel cells 14 (only one being shown) being arranged such that each cell is electrically connected in series with one another in a conventional manner (not shown). As seen in FIG. 2, each fuel cell 14 basically includes top and bottom bipolar plates 30 between which are sandwiched an anode electrode 32, an electrolyte-containing porous matrix 34 and a cathode electrode 36 (this arrangement may be inverted). Also, shims or gaskets 38 are ordinarily provided for sealing about the peripheries of the electrodes. In an exemplary embodiment, each bi-polar plate 30 is composed of a relatively thick rigid material such as compression molded graphite resin composite, while each electrode 32,36 is a thin sheet of a porous graphite material provided with a porous graphite fiber backing for added structural integrity. The matrix 34 is composed of thin tissue-like sheets made of porous graphite wetted or saturated with an electrolytic acid, such as concentrated phosphoric acid, through fill holes and flow grooves 40 (not seen in FIG. 2, but in FIG. 3) in the plate 30 which communicate with the supply and drain lines 24,26. Many other materials and structures can also be used to compose the components of the fuel cell 14.

Preferably, hundreds of the repeating fuel cells 14 (again, only one is shown) are united to form the fuel cell stack 12. Thus, the top bipolar plate 30 of each fuel cell also acts as the bottom bipolar plate 30 for the fuel cell immediately above it and the bottom bipolar plate 30 of each fuel cell also acts as the top bipolar plate for the fuel cell immediately below it. Also, a full fuel cell stack typically includes end plates (not shown) in the form of half-bipolar plates, with a top half-bipolar plate serving as the upper end plate and a bottom half-bipolar plate serving as the lower end plate.

The bipolar plates 30 are typically provided on opposite sides with a set of process channels (not seen in FIG. 2), including fuel channels on one side and oxidant channels on the other side, being configured in accordance with the improved features of the present invention, as will be described below. A fuel, such as hydrogen, flows through the fuel process channels, whereas an oxidant, such as a halogen, air or other oxygen-containing material, flows through the oxidant process channels. Fuel inlet and outlet manifolds (not shown) and oxidant inlet and outlet manifolds (not shown) are typically attached to respective inlet and outlet regions of the fuel cell stacks 12 in communication with the fuel and oxidant channels to provide fuel and oxidant flows to and from the stack. Electrical power and heat are generated by the interaction of the fuel and oxidant through the electrodes 32,36 and electrolyte matrix 34. An exemplary fuel cell 14 utilizes hydrogen fuel, air as the oxidant and phosphoric acid as the electrolyte.

Heat is generated by the electrochemical reaction and, accordingly, each of the stacks 12 ordinarily includes cooling modules (not shown). Dependent upon the operating temperatures desired, the cooling modules are placed between the fuel cells 14 at selected positions within the stack 12. A cooling module may, for example, be placed between approximately every fifth cell to every eighth cell. Each module is preferably comprised of a material similar to that of the bipolar plates 30 and has air cooling passages therethrough.

Improved Fuel Cell Plate Process Channel Arrangement and Configuration

Figure 3:
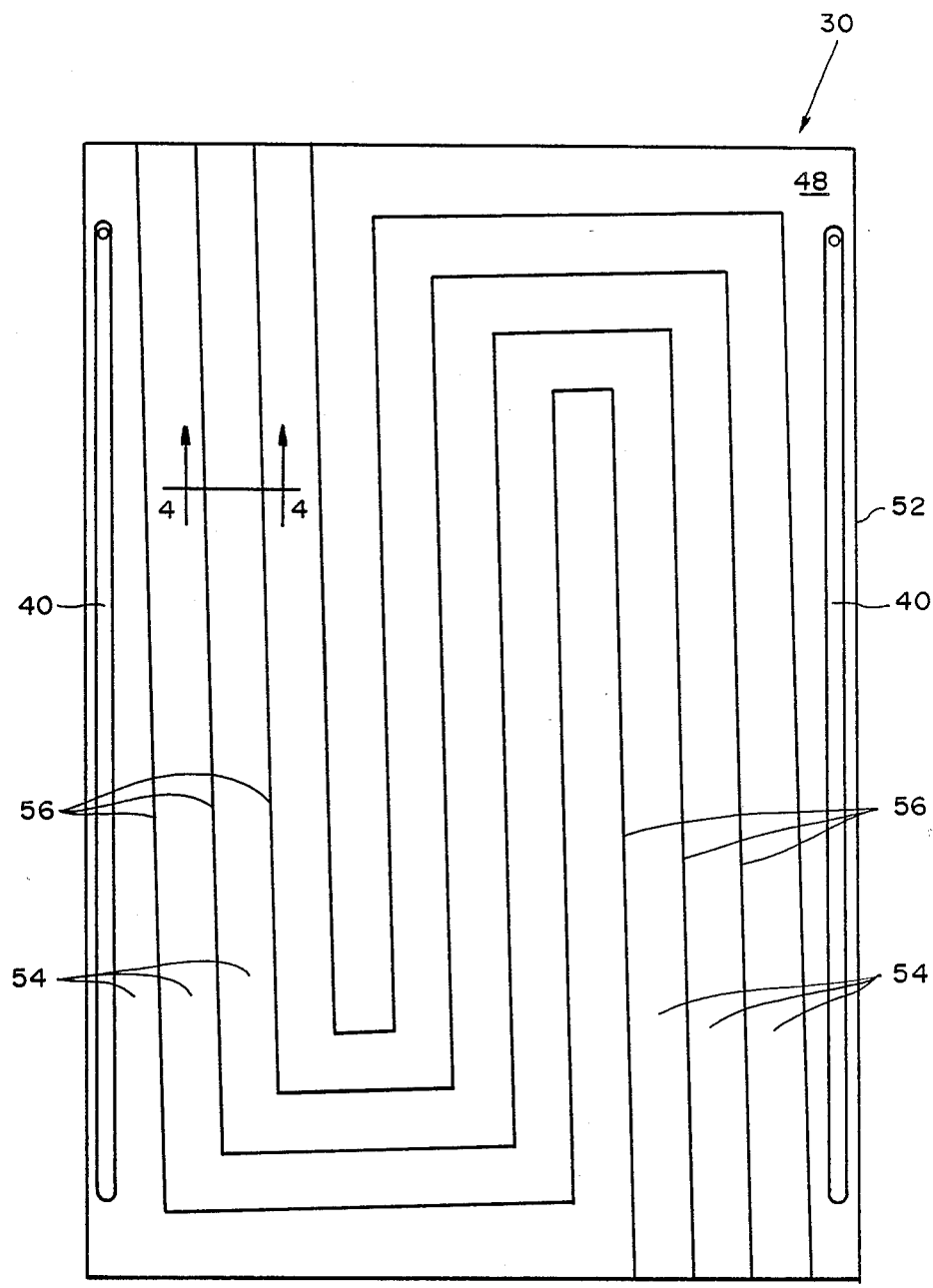
FIG. 3 is a diagrammatic representation of a bipolar plate surface having process gas flow channels defined in a serpentine configuration with the channels being represented by the lines, the channels also being skewed relative to the sides of the plate in accordance with one of the improved features of the present invention.
Figure 4:
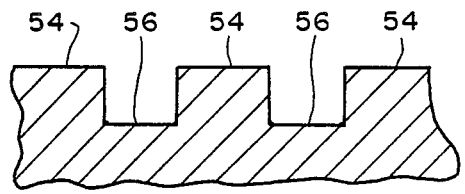
FIG. 4 is an enlarged fragmentary sectional view taken along line 4—4 of FIG. 3, showing the adjacent ribs and channels of the plate.
Figure 5:
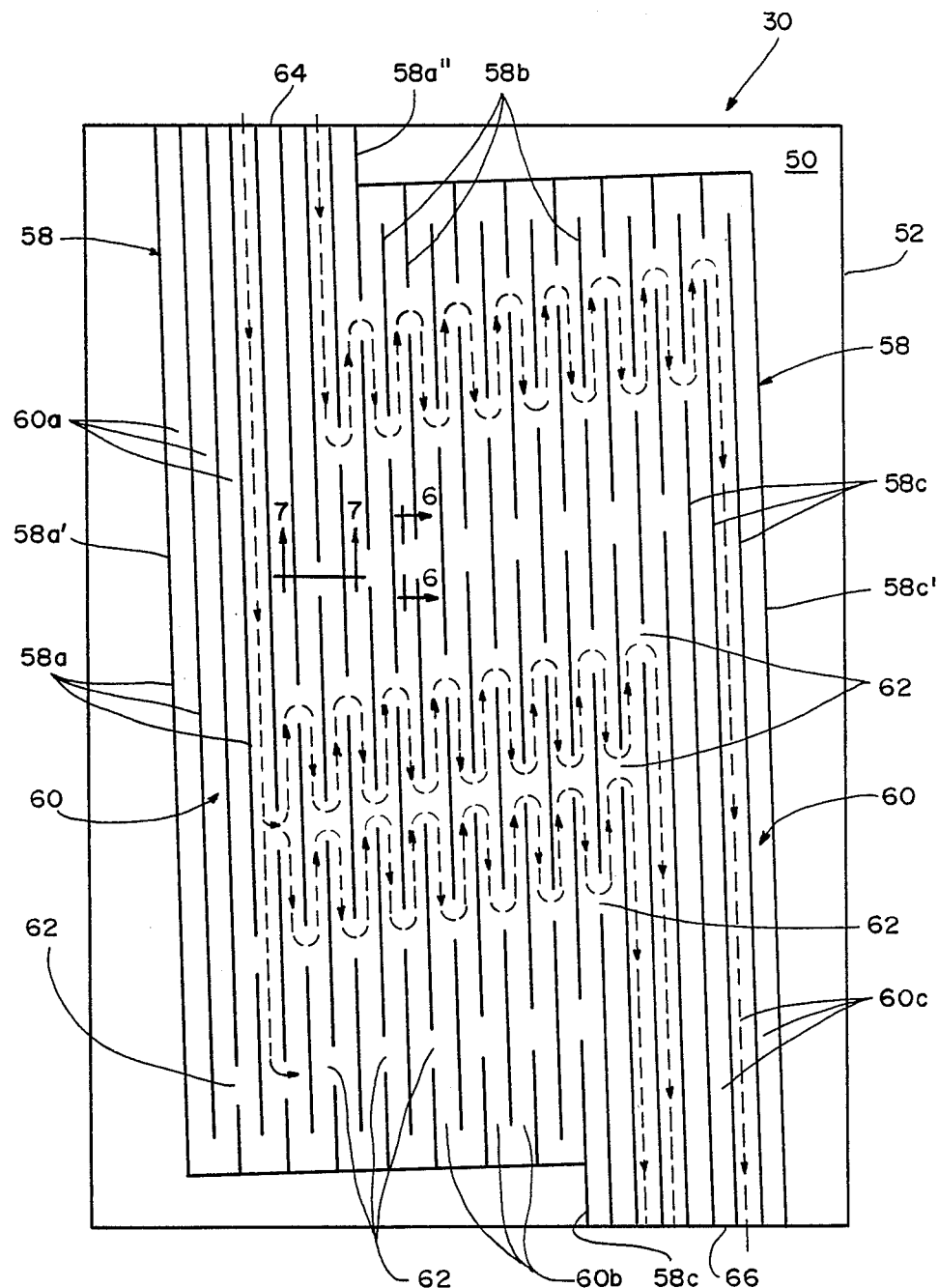
FIG. 5 is a diagrammatic representation of a bipolar plate surface having process gas flow channels defined in a modified serpentine configuration constituting one of the improved features of the invention claimed in the second cross-referenced application with the lands or ribs defining the channels therebetween being represented by the lines and the interruptions in the lines representing slots through the ribs which interconnect the channels in flow communication, the channels in the modified configuration also being skewed relative to the sides of the plate in accordance with the present invention.

Referring now to FIGS. 3 and 5 and to the features constituting the invention of the second cross-referenced application, there is seen the two opposite surfaces 48 (FIG. 3) and 50 (FIG. 5) on the base structure 52 of a bipolar plate 30 containing two different arrangements of process gas flow channels. (The fact that the channel arrangements are skewed relates to the present invention to be described later in reference to FIG. 8). In FIG. 3, one surface 48 of the plate 30 is provided with an arrangement of ribs 54 (see also FIG. 4) which define therebetween an arrangement of gas flow channels 56 having a generally serpentine configuration. The channels 56 (being represented by the lines in FIG. 3 whereas the ribs 54 are the remaining space between the lines) make a number of turns which increases the tortuousness of the process gas paths therethrough across the plate 30. In such manner, the pressure drop in the horizontal direction in the fuel cell is substantially increased (in relation to that in the vertical direction through the stack supply and exit passages), thereby improving the plate-to-plate flow distribution.

Figure 6:
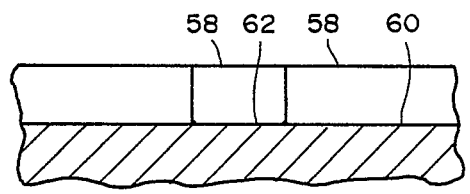
FIG. 6 is an enlarged fragmentary sectional view taken along line 6—6 of FIG. 5, showing a channel and a slot defined in a rib of the plate.
Figure 7:
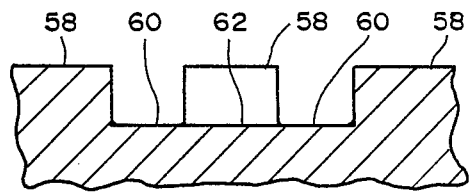
FIG. 7 is an enlarged fragmentary sectional view taken along line 7—7 of FIG. 5, showing channels, ribs and a slot defined in one rib of the plate.

In FIG. 5, the other surface 50 of the plate 30 is provided with another arrangement of ribs 58 (see also FIGS. 6 and 7) which define therebetween another arrangement of gas flow channels 60 having a generally modified serpentine configuration. In this configuration, the ribs 58 have formed therein a multiplicity of spaced slots 62, as seen also in FIGS. 6 and 7. (In FIG. 5, the ribs 58 are represented by the lines, the channels 60 by the spaces between the lines, and the slots 62 by the interruptions along the lines.) The channels 60 are generally linear and extend generally parallel to one another. The slots 62 interconnect and provide flow communication between adjacent channels 60. Adjacent pairs of the channels 60 are interconnected to one another in flow communication. As a general design principle, the slots 62 in each one rib 58 are located in offset relation to the slots 62 in the ribs adjacent to the one rib, and the slots in any one rib 58 are generally aligned with the slots 62 in every other rib 58. Thus, while the channels 60 define generally longitudinal linear paths for gas flow, the spaced slots 62 facilitate cross channel flow of process gas in a staggered fashion which creates a series of generally parallel mini-serpentine flow paths extending transverse to the longitudinal gas flow along the channels 60.

More particularly, the ribs 58 and channels 60 can be divided into three basic groups. The first group of ribs 58a have offset slots 62, and the slots 62 in one rib 58 are aligned with those in every other rib, as mentioned earlier. The ribs 58a of the first group also have an outermost rib 58a' and an innermost rib 58a'' as well as a succession of ribs 58a therebetween. The outermost rib 58a' has the lowest number of the slots 62 therein and displaced the furthest from the entry edge 64 of the plate base 52. The innermost rib 58a'' has the highest number of the slots 62 therein and displaced the closest to the entry edge 64 of the plate base 52. With respect to the slots 62 in the succession of the ribs 58a between the outermost and innermost ones, their number generally increases going from those of the ribs 58a closer to the outermost rib 58a' to those of the ribs 58a closer to the innermost rib 58a''. The first group of gas flow channels 60a at ones of their opposite ends open at the gas entry edge 64 of the plate base 52. The channels 60a are connected together in flow communication in adjacent pairs at the others of their opposite ends.

The second group of ribs 58b, as mentioned before, have slots 62 located in offset relation and the slots in any one rib 58 are generally aligned with the slots 62 in every other rib 58. The second group of gas flow channels 60b are connected together in flow communication in adjacent pairs at their respective opposite ends.

The third group of ribs 58c and channels 60c are substantially identical to the first group thereof when rotated 180 degrees, and thus need not be described in detail. Suffice it to say that the ribs 58c have the same arrangement of slots 62 as the ribs 58a, and have innermost and outermost ribs 58c' and 58c'' and the succession of ribs 58c therebetween. The slots 62 are found in the same pattern in the third group as in the first group of ribs. The third group of gas flow channels 60c at ones of their opposite ends open at the opposite exit edge 66 of the plate base 52 and are connected together in flow communication in adjacent pairs at their others of their opposite ends.

As is apparent in FIG. 5, the second group of ribs 58b and channels 60b are disposed between the first and third groups thereof with the slots 62 in the innermost ribs 58a'',58c'' of the first and third groups thereof interconnecting and providing flow communication between respective adjacent channels 60a,60b in the first and second groups thereof and respective adjacent channels 60b,60c in the second and third groups thereof.

The modified serpentine configuration in FIG. 5 of the channels 60 and ribs 58 which contain the slots 62 providing cross flow between the channels 60 provides an even more complex tortuousness of the process gas paths across the plate 30 and thereby improves pressure drop and plate-to-plate flow distribution even further. In addition, the wavy configuration or serpentine-like mini-paths (see dashed lines with arrows in FIG. 5) superimposed on the general channel direction avoid the tendency to shear the electrodes which can arise under certain conditions of misalignment due to tolerance variations in molded plates using counterflow channel arrangements.

Figure 8:
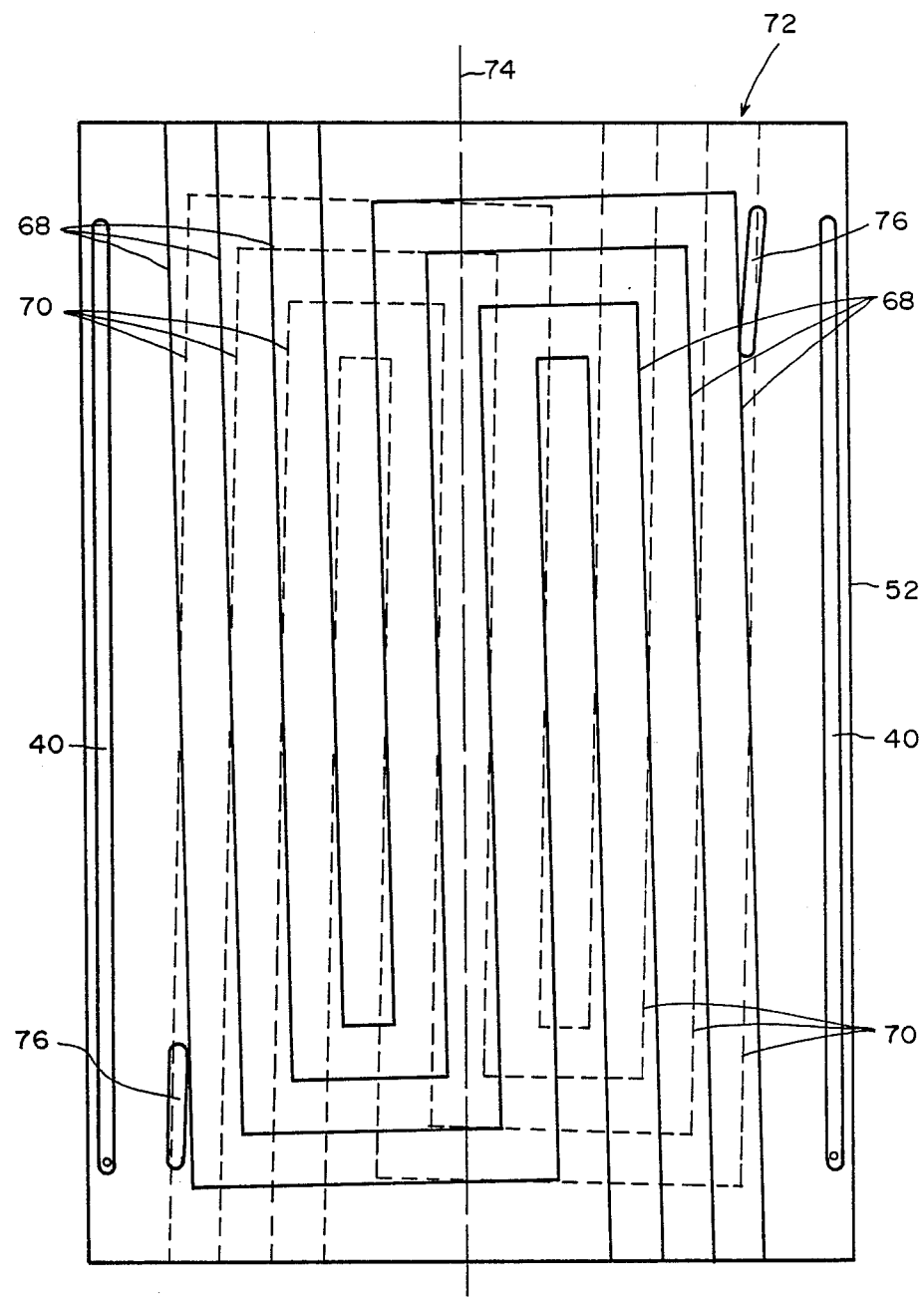
FIG. 8 is a diagrammatic representation of a bipolar plate having a first plurality of process gas flow channels, being shown in solid line form, defined in a top surface of the plate in a first serpentine configuration skewed relative to a longitudinal centerline of the plate in a counterclockwise direction about the center of the plate and a second plurality of process gas flow channels, being shown in dashed line form, defined in an opposite bottom surface of the plate in a second serpentine configuration skewed relative to the longitudinal centerline of the plate in a clockwise direction about the center of the plate and in an opposite sense to the first plurality of channels.

Finally, in FIG. 8, another improved feature which constitutes the present invention relates to the skewed arrangement of the process gas channels 68,70 on the opposite surfaces of the bipolar plate 72. While the channel arrangements in FIG. 8 have identical serpentine configurations, they can be of any arrangement which has some generally parallel channel portions (The serpentine and modified or enhanced serpentine channel arrangements of FIGS. 3 and 5 are also skewed). When the two of the plates 72 are provided in a fuel cell, the process gas channels on the lower surface of the one plate above the anode electrode and the process gas channels on the upper surface of the other plate below the cathode electrode will be skewed in opposite directions. Thus, with respect to each bipolar plate 72 used in assembly of the fuel cells, the process channels 68 (shown in solid line form in FIG. 8) on the upper side of the plate 72 are skewed the same amount in one direction as the channels 70 (shown in dashed line form in FIG. 8) are skewed in the opposite direction relative to a common longitudinal horizontal centerline 74 of the plate. The skewed arrangement prevents gas channel misalignment prevalent in parallel channel arrangements due to manufacturing and assembly tolerances, and provides a uniform cell contact area resulting in a more uniform distribution of fuel cell stack compression loads.

As stated above, the skewed arrangement of process gas channels is applicable to any channel arrangement that has parallel channels. The amount of skew angle is chosen large enough to ensure that channel alignment tolerances do not bring the channels back into parallel relationship. Calculations using various skew angles for a given length plate, a specific rib width and groove pitch show that any skew angle selected for such a plate will produce a constant contact area to nominal area ratio (0.16). Therefore, the amount of skew angle should be no larger than required in order to minimize the loss in cell active area (i.e., the area in which process gas channels, above and below the electrodes, would intersect when overlaid on each other) for specific size plate channels. The loss in cell active area can be substantially reduced with the addition of one or more gas-holding grooves 76 in the areas where the channels 68,70 on opposite sides of the fuel cell do not intersect. However, preferably the gas-holding grooves 76 intersect and are in flow communication with the process channels on the same side of the bipolar plate. The number of grooves 76 that may be added are determined by the specific size of the channeled plate and the skew angle used.

It is thought that the present invention and many of its attendant advantages will be understood from the foregoing description and it will be apparent that various changes may be made in the form, construction and arrangement thereof without departing from the spirit and scope of the invention or sacrificing all of its material advantages, the form hereinbefore described being merely a preferred or exemplary embodiment thereof.

We claim:

1. In an electrochemical fuel cell including an anode electrode, a cathode electrode, an electrolyte matrix sandwiched between said electrodes and a pair of plates above and below said electrodes, said plates having corresponding pairs of opposite edges, said plate above said electrodes having a lower surface with a first group of process gas flow channels formed thereon and said plate below said electrodes having an upper surface with a second group of process gas flow channels formed thereon, said channels of each group extending generally parallel to one another, the improvement which comprises:

said process gas flow channels on said lower surface of said plate above said anode electrode and said process gas flow channels on said upper surface of said plate below said cathode electrode being open at their opposite ends at the same ones of said corresponding edges of said plates and being skewed substantially the same amount in opposite directions such that contact areas of said surfaces of said plates through said electrodes are formed in criss-cross arrangements; and at least one gas-holding groove defined in areas of said surfaces of said plates where said channels are absent for holding process gas and increasing electrochemical activity of said fuel cell.

2. The fuel cell as recited in claim 1, wherein said at least one gas-holding groove in each plate surface intersects with said process channels therein.

3. A bipolar plate for a fuel cell, comprising:
(a) a base having a pair of opposite surfaces with pairs of opposite edges and a longitudinal centerline;
(b) a first arrangement of process gas flow channels on one of said surfaces of said base;
(c) a second arrangement of process gas flow channels on the other of said surfaces of said base;
(d) said first arrangement of channels being skewed the same amount in one direction as said second arrangement of channels are skewed in the opposite direction relative to said longitudinal centerline of said base;
(e) said first and second arrangements of channels on said opposite surfaces of said base being open at their opposite ends at the same corresponding edges of said surfaces of said base;
(f) at least one gas-holding groove in areas of said surface of said plates where said channels are absent for holding process gas and increasing electrochemical activity of said fuel cells.

4. The bipolar plate as recited in claim 3, further comprising:

a first arrangement of ribs on said one of said opposite surfaces of said base defining said first arrangement of gas flow channels; and a second arrangement of ribs on said other of said opposite surfaces of said base defining said second arrangement of gas flow channels;

each of said rib arrangements also defining a plurality of gas-holding grooves in areas of said surfaces where said channels are absent for holding process gas and increasing electrochemical activity of said fuel cell.

5. The bipolar plate as recited in claim 3, wherein said at least one gas-holding groove in each plate surface intersects with said process channels therein.

* * * * *